Feb. 14, 1967  D. P. SMITH  3,304,122
MOBILE STORAGE AND DISPENSING DEVICE
Filed May 10, 1965  4 Sheets-Sheet 4
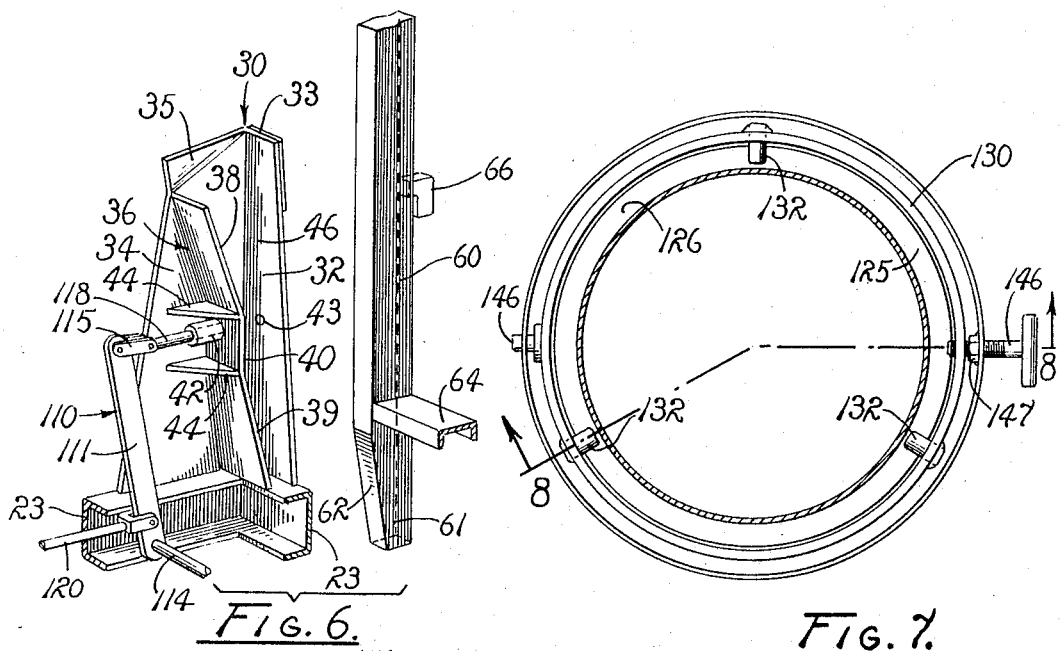
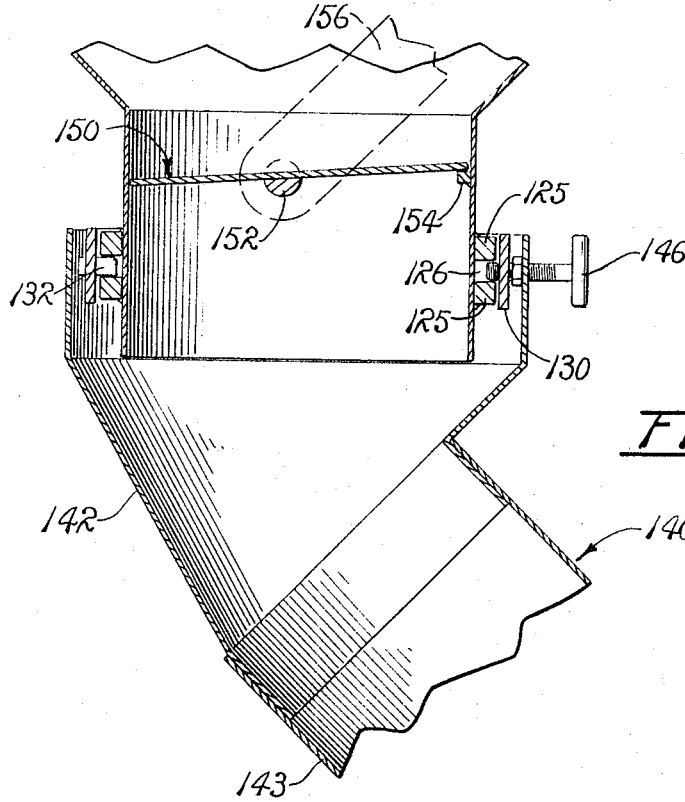
DAVID P. SMITH
INVENTOR
Huebner & Worrel
ATTORNEYS United States Patent Office 3,304,122
Patented Feb. 14, 1967

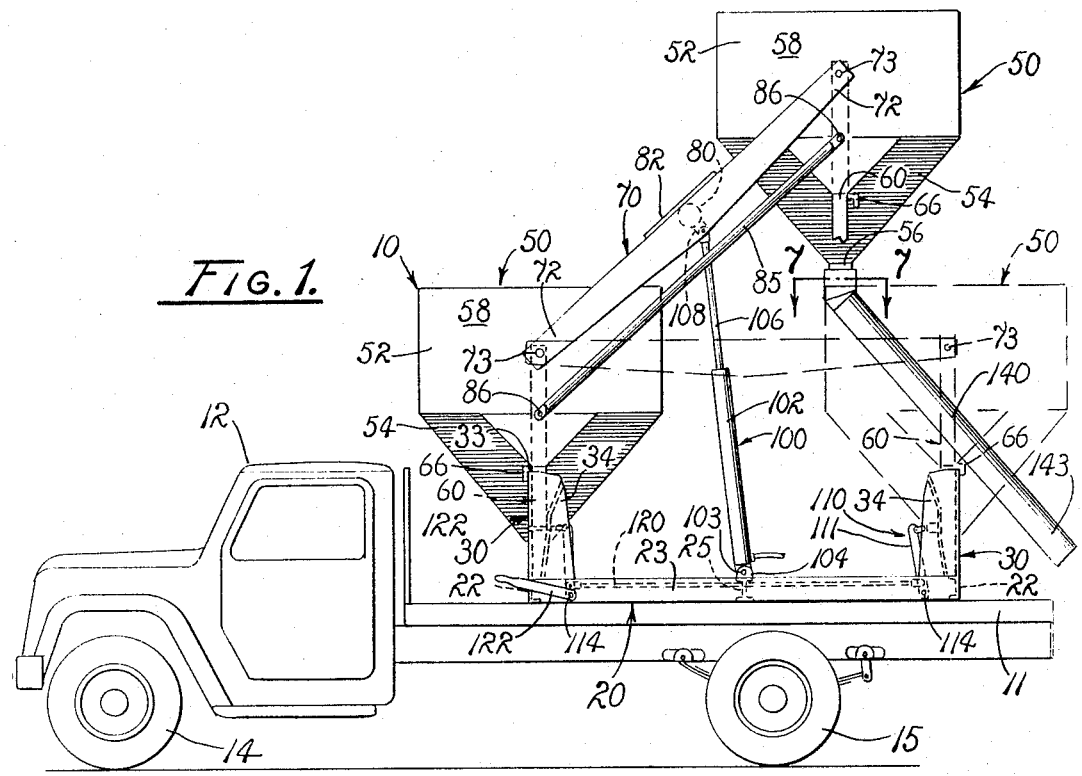
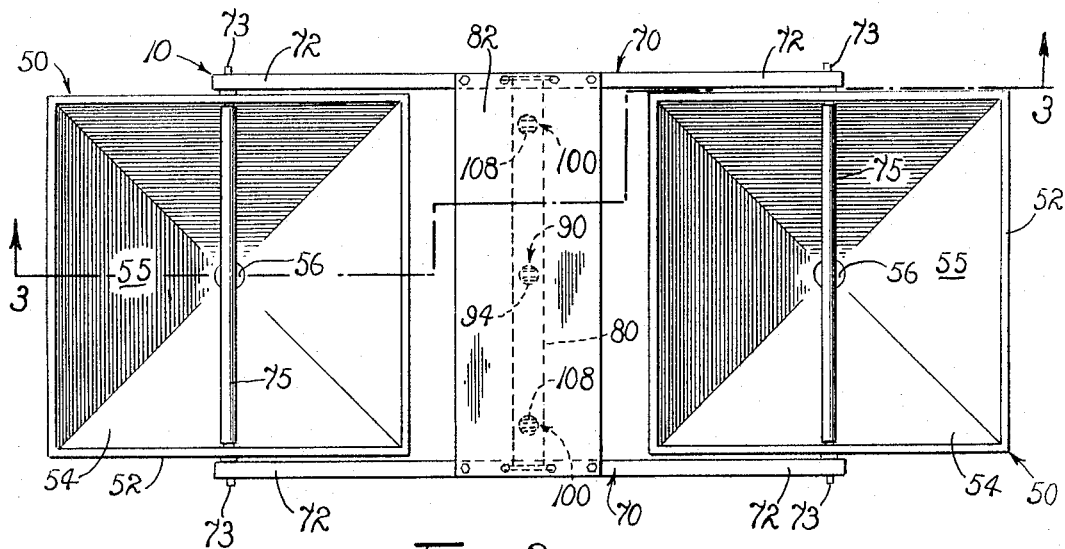

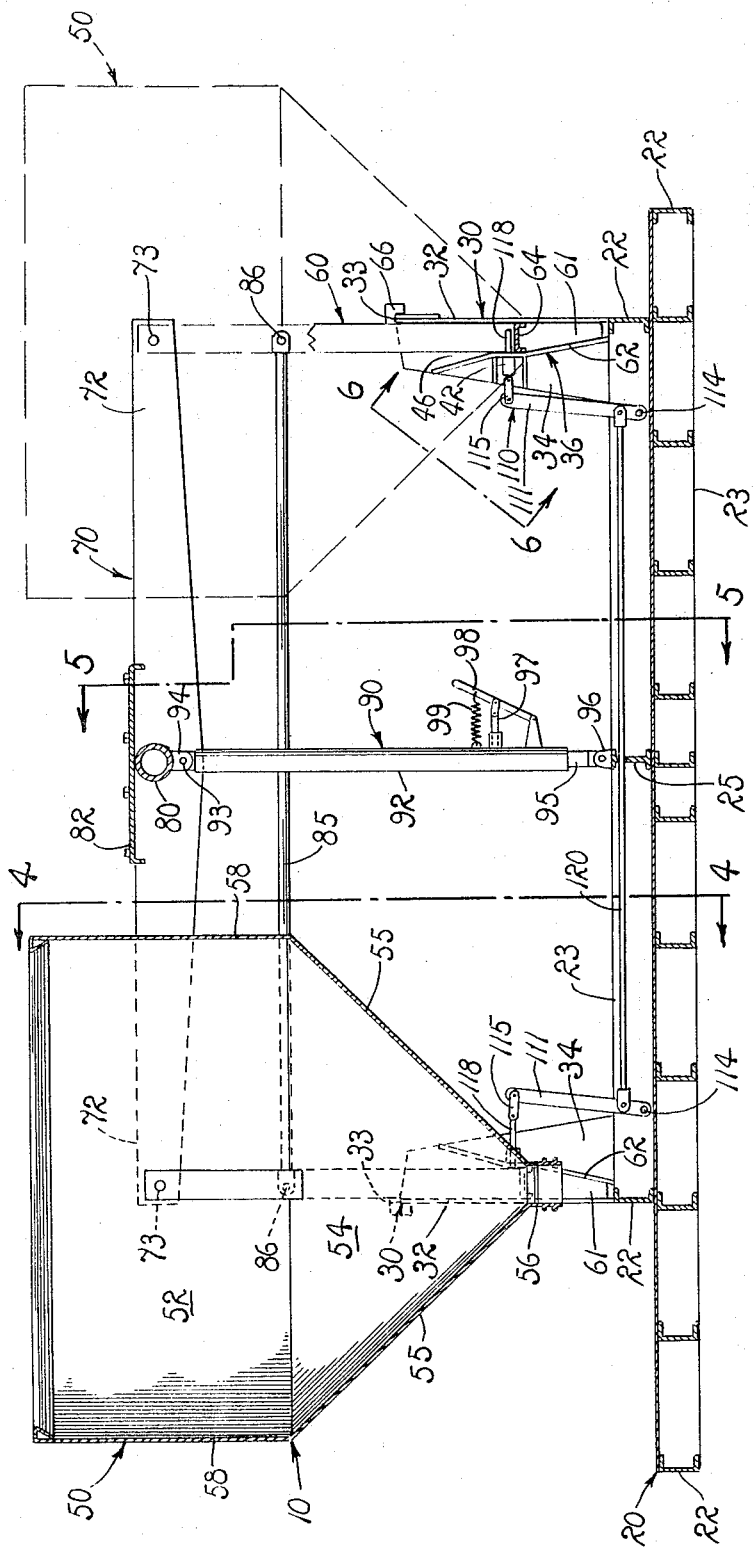

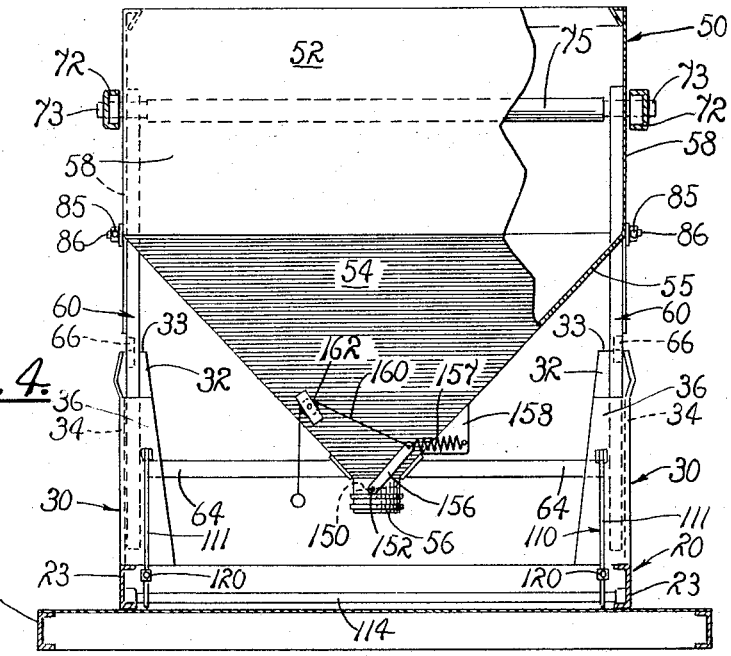

3,304,122
MOBILE STORAGE AND DISPENSING DEVICE
David P. Smith, 2606 Christmas Tree Lane,
Bakersfield, Calif. 93306
Filed May 10, 1965, Ser. No. 454,428
7 Claims. (Cl. 298—7)

The present invention relates to a mobile storage and dispensing device for bulk material and more particularly to such a device having a pair of elevatable hoppers for field servicing of distributing equipment for such bulk material.

Fertilizers spreaders, seed planters and other distributing equipment for dry flowable bulk material such as soil amendments, seed, feed and the like are usually provided with relatively small capacity hoppers for storing the material to be distributed so as to have desired mobility and maneuverability. Consequently, the hoppers must frequently be filled in order to provide continuous operation for extended periods. Heretofore, it has been the practice to provide the bulk material in large sacks which are transported to the field or area of distribution on trucks. The sacks must be lifted from the trucks, opened and manually dumped into the hoppers of the particular pieces of distributing equipment. This presents a time-consuming and an onerous task particularly when the hopper filler opening is elevated a considerable distance from the ground, as is usual in gravity fed distributing devices. In some equipment, the filler openings of the hoppers are disposed at such heights above the ground that ladders or other types of elevating mechanisms must be utilized which require additional workmen and create serious safety hazards. It is therefore believed desirable to provide a mobile storage and dispensing device for bulk material which can serve to fill the smaller capacity hoppers on the distributing equipment at the sites of distribution.

Accordingly, it is an object of the present invention to provide an improved mobile storage and dispensing device for bulk materials.

Another object is to provide such an improved mobile storage and dispensing device which is capable of quickly and conveniently filling the relatively small capacity hoppers of distributing equipment for such material.

Another object is to provide a mobile storage and dispensing device which may be conveniently mounted on a mobile vehicle, such as a flat-bed truck or the like.

Another object is to provide a mobile storage and dispensing device having a pair of relatively large capacity hoppers.

Another object is to provide a mobile storage and dispensing device having hoppers which can be elevated to insure free gravitational descent of material for discharge at elevated positions.

Another object is to provide such a mobile storage and dispensing device wherein the hoppers can be raised to a sufficient elevation for discharge of material into a wide variety of hoppers employed on contemporary distributing equipment.

Another object is to provide a mobile storage and dispensing device which has a pair of material hoppers which can be selectively alternately elevated by a single powered unit.

Another object is to provide a mobile storage and dispensing device which does not require precise positioning with respect to distributing equipment during the filling thereof.

Another object is to provide a mobile storage and dispensing device which is capable of discharging bulk material in substantially any direction therefrom.

Other objects and advantages of the present invention will become more fully apparent in the following description in the Specification.

In the drawings:

FIG. 1 is a side elevation of a mobile storage and dispensing device embodying the principles of the present invention shown mounted on a flat-bed truck and having a pair of material hoppers, one of which is shown in full line in an elevated position and in dashed line in an alternate lowered transport position.

FIG. 2 is a top plan view of the mobile storage and dispensing device of the present invention.

FIG. 3 is a somewhat enlarged longitudinal vertical section through the mobile storage and dispensing device, taken on line 3—3 of FIG. 2.

FIG. 4 is a transverse vertical section through the mobile storage and dispensing device, taken on line 4—4 of FIG. 3.

FIG. 5 is a transverse vertical section through the device, taken on line 5—5 of FIG. 3.

FIG. 6 is a somewhat enlarged fragmentary perspective view of a locking mechanism associated with the hoppers of the present invention looking in the direction of the arrows on line 6—6 of FIG. 3.

FIG. 7 is a somewhat enlarged horizontal transverse section through a discharge nozzle of one of the hoppers, taken on line 7—7 of FIG. 1.

FIG. 8 is a somewhat enlarged transverse vertical section, taken generally along the line 8—8 of FIG. 7.

Referring more particularly to the drawings, a mobile storage and dispensing device embodying the principles of the present invention is indicated generally by the reference numeral 10. As best shown in FIG. 1, the device is mounted on the flat-bed 11 of a truck 12. The truck includes front wheels 14 and rear wheels 15 the latter of which are substantially disposed in centered relation beneath the flat-bed 11. It will be readily apparent that the device of the present invention is not limited to being mounted on such a truck but also may be disposed on a trailer or other mobile vehicle.

The mobile storage and dispensing device 10 employs an elongated substantially rectangular base frame 20 including end channels 22 and side channels 23 rigidly interconnected as by welding or the like. An elongated I-beam 25 is disposed in transversely extended interconnecting relation between the opposite side channels 23 intermediate the end channels 22. The frame is rigidly secured to the flat-bed 11 of the truck in any suitable manner, not shown, as by bolting or the like. At each intersection of the side and end channels of the base frame is disposed a substantially upright wrap around corner guide 30 rigidly secured thereto as by welding or the like. As best shown in FIG. 6, each of the corner guides includes a straight end wall 32 having an upper edge 33 and a continuous side wall 34 having an upper outwardly flared flange 35.

Each of the corner guides 30 includes an inclined inner plate 36 disposed in inwardly spaced relation from the end wall 32 which is rigidly secured at its lower end to the end channel 22 of the frame and along its outer side to the side wall 34 by welding. The inclined plate 36 provides upper and lower offset inclined wall portions 38 and 39, respectively, which are interconnected by a substantially straight vertical intermediate portion 40. An elongated tubular guide sleeve 42 is mounted through the intermediate portion 40 of the inclined plate in substantially horizontal alignment with a pin receiving bore 43 in the outer end wall 32 of the corner guide 30. The inclined plate is further strengthened by a pair of gussets 44 on each side of the intermediate portion 40 thereof which are rigidly connected to the side wall 34 by welding. The end wall 32 and the inclined plate 36 thereby define therebetween an elongated downwardly tapered guide passage or channel 46 for a purpose more fully to be described.

A pair of box-like material hoppers 50 are supported on the base frame 20 of the mobile storage and dispensing device 10 respectively adjacent to the opposite end channels 22 and between the side channels 23 of the frame. Each of the hoppers provides an open material receiving upper portion 52 and a lower frusto-pyramidal lower portion 54. The lower portion has downwardly converging walls 55 which terminate in a substantially circular discharge spout 56. The upper portion includes opposite side walls 58 from which individually depend a pair of elongated standards or legs 60. Each of the legs provides a lower end 61 having an inwardly disposed tapered surface 62. A substantially horizontal channel brace 64 is extended between the lower end of each of the legs and the adjacent wall of the lower portion 54 of the hoppers in rigidly interconnecting relation therebetween. An integral, downwardly extended hook 66 is extended from the outer side of the legs intermediate their ends to engage the upper edge 33 of the end wall 32 of the corner guides 30, as best shown in FIG. 3.

The hoppers 50 are pivotally interconnected at each of their corresponding opposite sides 58 by a pair of elongated lift arms 70. Each of the lift arms provides opposite ends 72 which are individually journaled on the outer ends 73 of respective elongated pivot shafts 75 extended centrally through each of the hoppers and through the upper ends of the legs 60. A tubular support pipe 80 is transversely extended and rigidly interconnected between the arms by welding thereto intermediate their ends. A cover plate 82 is disposed in transversely interconnecting relation between the arms above the support pipe 80 for imparting additional rigidity to the lift arm structure. A pair of elongated stabilizer rods 85 are pivotally connected at their respective opposite ends at 86 on the corresponding sides 58 of the hoppers below the pivotal connections of the arms with the hoppers in substantially parallel relation to the arms. The arms and rods thereby provide a parallelogram linkage interconnecting the hoppers to maintain them in upright attitude during relative elevational movement subsequently to be described.

An elongated telescopic support column 90 is disposed between the lift arms 70 and the frame 20 positively to hold the arms in their elevated positions, as shown in FIG. 1. The support column provides an upper tubular sleeve 92 which is pivotally connected at its upper end by a pin 93 to a pair of depending brackets 94 rigidly secured to the support pipe 80 between the arms. The column further includes a lower pipe 95 which is telescopically received within the sleeve 92 and is pivotally connected at its lower end to the I-beam 25 by a pair of upstanding brackets 96 rigidly upwardly extended from the I-beam intermediate the side channels 23 of the frame 20. An automatic safety locking device having an elongated pin 97 extendable through the column 90 is provided for positively holding the column in an extended position. The pin is pivotally mounted on a lever 98 pivoted on the upper sleeve 92 and is continually urged toward the column by a spring 99 secured therebetween.

A pair of transversely spaced hydraulic jacks 100 are individually disposed in substantially upright attitude between the lift arms 70 and the frame 20 for effecting elevational swinging movement of the arms and the hoppers 50. The hydraulic jacks are individually disposed closely adjacent to the ends of the support pipe 80 and provide lower cylinder ends 102 pivotally mounted on the I-beam 25 by pins 103 on brackets 104 secured to the I-beam. The jacks include opposite upper rod ends 106 pivotally mounted adjacent to the ends of the support pipe between the arms on pins 107 by brackets 108 secured to the pipe.

A locking mechanism generally indicated by the reference numeral 110 is disposed on the frame for alternately holding and releasing the hoppers 50 relative to the frame. As best shown in FIGS. 3 and 6, the locking mechanism includes a plurality of substantially upstanding levers 111 individually adjacent to the corner guides 30. Pairs of the levers are rigidly mounted for rotation upon elongated mounting rods 114 journaled between the opposite side channels 23. At their upper ends each of the levers pivotally mounts through a link 115 an elongated locking pin 118. The pins are individually receivable in the guide sleeves 42 in the inclined plate 36 of the corner guides 30.

The levers 111 on corresponding sides of the frame 20 are pivotally interconnected by an elongated connecting rod 120 so that the pins 118 at the opposite ends thereof are alternately disposed in a position extended through the guide channel 46 and into locking engagement through the bore 43 and a position removed therefrom. As best shown in FIG. 3, when the legs 60 of the hoppers 50 are disposed within the guide channels 46 the pins 118 disposed through the channel in a locking position are disposed immediately above the braces 64 to preclude upward movement of the legs from the channel. A control handle 122 is mounted on the forwardly disposed pivot rod 114 to effect such insertion and removal of the pins 118 from their respective sleeves and bores.

An articulated connector 124 is provided on the discharge spout 56 of the hoppers 50. As best shown in FIG. 8, the connector includes a pair of axially spaced rings 125 which are rigidly mounted on the discharge spout of each of the hoppers to define therebetween an annular slot 126 circumscribing the spout. An intermediate rotary ring 130 is disposed in circumscribing relation about the rings 125 and includes a plurality of inwardly extended studs 132 which are received in sliding relation within the slot. An elongated tubular telescoping discharge chute 140 is connected to the discharge spout 56 of the hopper. The chute provides a funnel-shaped upper end 142 which mounts a lower telescopic portion 143 of the chute in angularly downwardly inclined relation therefrom. The upper end of the chute further provides a pair of diametrically opposed screw threaded bolts 146 which are screw threadably received within suitable, threaded bores 147 in the ring 130. Such connection thereby accommodates both rotational and swinging movement of the chute about the horizontal axis of the bolts 146.

A flapper-type control valve 150 is pivotally mounted within the discharge spout 56 of the hopper on a pivot rod 152. It will be noted that the pivot rod is offset with relation to the center of the valve so that material in the hopper normally tends to provide a force tending to maintain the valve in a closed position against a stop member 154 rigidly mounted within the spout 56. The valve is actuated by an elongated lever 156 which is shown in FIG. 4 having a lower end rigidly connected to a pivot rod 152 on the valve and an opposite end having an elongated tension spring 157 connected between it and a bracket 158 on the hopper 50. An elongated tension member 160 is connected to the upper end of the lever and is trained over a pulley 162 on the hopper to manipulate the valve to an open position against the spring 157.

Operation

The operation of the described embodiment is believed to be readily apparent and is briefly summarized at this point. Before proceeding to a site of material distribution, the mobile storage and dispensing device 10 of the present invention is loaded with a dry, flowable bulk material such as fertilizer, seed or the like at an appropriate loading site. During such loading operation, the hoppers 50 are disposed in their lower positions of FIG. 3 and the hoppers filled through the upper opened portions 52. The valves 152 therein are automatically closed by the weight of such material thereon and by the springs 157. After being filled, the weight of the material within the hoppers maintains the legs 60 thereof within the guide channels 46 of the corner guides 30.

After reaching the distributing site, the truck 12 is maneuvered into proximate position relative to a distributing device, such a fertilizer spreader or the like so that the discharge end of the chute 140 can be directed to discharge material therein. The handle 122 is actuated to the left to swing the levers 111 in a counter-clockwise direction, as viewed in FIG. 1, to withdraw the locking pins 118 from the guide channels 46 so as to liberate the legs 60 of the rearwardmost hopper. During such actuation, the opposite forwardly disposed levers 111 are swung in the same direction to insert the pins 118 through their respective guide channels 46 and into the bores 43 in locking position above their respective braces 64 on the forwardly disposed hopper. The pins thereby positively hold the forward hopper in its lowermost position on the frame for subsequent operation of the rearward hopper.

Upon actuation of the hydraulic jacks 100, the lift arms 70 are swung upwardly about the pivot rod 75 of the forwardmost hopper 50. The opposite ends of the arms are thereby swung upwardly to carry the hopper to full line discharge position of FIG. 1. During such movement the stabilizing rods 85 maintain the hopper in a substantially horizontal attitude and the legs 60 thereof in substantially vertical position. It is also significant that the weight of the elevated hopper is transferred downwardly through the hydraulic jacks to a position substantially over the rear wheels 15 of the truck 12. Such weight transfer is effective to minimize any tendency the truck may have to tip by virtue of the elevated hopper. Simultaneously, with the hopper reaching its maximum elevated position, the pin 97 of the safety locking device is extended through the support column 90 above the upper end of the lower pipe 95 to prevent inadvertent lowering of the hopper. The discharge chute 140 can then be rotated and laterally swung to substantially any position from the truck 12 within its range precisely to aim the chute in any direction.

The tensioning member 160 is then pulled by the operator to swing the control lever 156 against the spring 157 to open the valve 150 within the discharge spout 56 of the hopper 50. Such movement permits the dry flowable material within the hopper gravitationally to descend through the chute 140 for filling the hopper of a distributing device or for other discharge. It is apparent that the flow of material can be stopped at any point upon release of the tension member 160 which permits the spring 157 to close the valve 150 with the remaining material in the hopper providing a force positively to hold the valve in such closed position.

As soon as the rearwardmost hopper 50 is emptied, it is lowered by first withdrawing the safety pin 97 on the support column 90 and retraction of the hydraulic jacks 100 toward the base frame 20. During such lowering of the hopper the legs 60 thereof are guided into the guide channel 46 by the upper flanged portion 35 thereof. Upon reaching the lowermost position with the legs fully received within the guide channels 46, the handle 122 of the locking mechanism is swung to the right, as shown in FIG. 1, to insert the locking pins 118 thereof in their respective bores 43. Simultaneously the locking pins 118 at the opposite ends of the control rods 120 are withdrawn from their respective bores 43 to unlock the forwardmost hopper 50. Subsequent extension of the hydraulic jacks then raises the forwardmost hopper by pivotal swinging movement of the lift arms 70 about the pivot rod 75 of the rearwardmost hopper in the manner previously described during elevational positioning of the rearwardmost hopper.

It is also significant that when the hoppers are disposed in their lower latched positions, the hooks 66 preclude any twisting movement of the hopper and the lift arms 70. When one of the hoppers is disposed in its raised position, the mounting vehicle 12 may be disposed on a transverse incline which would normally tend to cause lateral shifting of the upper hopper 50. Such lateral shifting, however, is resisted by the hooks 66 on each side of the lowermost lowered hopper engaging the upper edges 33 of their respective end walls 32 of the corner guides 30 which maintain the arms in precise parallel relation.

In view of the foregoing it is readily apparent that the structure of the present invention provides an improved material storage and dispensing device which may be conveniently mounted on any suitable mobile vehicle for servicing the usual distributing equipment in the field or for other delivery. The structure of the present invention permits the hoppers successively to be elevated to a maximum height to insure free gravitational descent of the material therefrom into even the largest of contemporary distributing mechanisms by pivotally mounting the hoppers on each other through a parallelogram linkage. The articulated connector for the discharge chute permits material to be discharged in substantially any direction from the mounting vehicle. When either hopper is elevated, the weight thereof is transferred downwardly through the hydraulic jacks which are centrally mounted between the hoppers to provide centralized distribution of the weight over the mounting truck bed. It is also significant that the locking mechanism of the present invention enables one hopper to be automatically locked in place while simultaneously releasing the other for elevational positioning to its material discharge position.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A mobile storage and dispensing device for bulk material comprising a frame adapted to be mounted on a mobile vehicle; a pair of hoppers for such material providing separate material discharge means; lock means selectively releasably latching said hoppers to said frame; and link means pivotally interconnecting said hoppers in spaced relation on the frame including an expandable member for raising a selected one of said hoppers to a position elevated from the frame to insure free gravitational descent of said material from the selected hopper, and the other of said hoppers being releasable and elevationally positionable upon the return of said selected hopper to a locked position on the frame incident to a subsequent actuation of said expandable member.

2. A mobile transport and dispensing device comprising a vehicle, a frame mounted on the vehicle, a pair of upright hoppers positioned in spaced relation on the frame, a parallelogram linkage pivotally interconnecting the hoppers for relative elevational movement while constraining the hoppers to substantially upright attitude, telescopically adjustable powered means pivotally mounted on the frame intermediate the hoppers and pivotally connected to the parallelogram linkage in elevational controlling relation thereto, and means for selectively alternately latching the hoppers to the frame while releasing the opposite hopper for elevational movement.

3. A mobile storage and dispensing device for bulk material comprising a frame adapted to be mounted on a mobile vehicle; a pair of hoppers for such material providing separate material discharge orifices therein; link means pivotally interconnecting said hoppers in spaced relation on the frame; lock means on the frame selectively releasably latching said hoppers to the frame; and powered means borne by the frame for raising a selected one of said hoppers to a position elevated from the frame to insure free gravitational descent of said material from the orifice of the selected hopper, and the other of said hoppers being releasable and elevationally positionable upon the return of said selected hopper to a lock position on the frame incident to a subsequent actuation of said powered means.

4. A mobile storage and dispensing device for flowable bulk material comprising an elongated frame having opposite ends adapted to be mounted on a mobile vehicle; a pair of box-like hoppers for such material individually providing separate material discharge orifices therein; link means pivotally interconnecting said hoppers in spaced relation on the frame individually adjacent to said ends thereof; lock means on the frame selectively, releasably latching said hoppers to said frame; and powered means pivotally interconnecting the frame and said link means intermediate the hoppers for raising a selected one of said hoppers to a position elevated from the frame to insure free gravitational descent of said material from the orifice of the selected hopper, and the other of said hoppers being releasable and elevationally positionable upon the return of said selected hopper to a lock position on the frame incident to a subsequent actuation of said powered means.

5. A mobile storage and dispensing device for flowable bulk material comprising an elongated frame having opposite ends adapted to be mounted on a mobile vehicle; a pair of box-like hoppers for such material having opposite sides and individually providing separate material discharge orifices therein; a pair of elongated lift arms having opposite ends individually pivotally connected to corresponding sides of said hoppers individually to space the hoppers adjacent to the ends of the frame; lock means extended longitudinally of the frame between its ends selectively releasably to latch said hoppers to the frame; and powered means pivotally interconnecting the frame and said link means intermediate the hoppers for raising a selected one of said hoppers to a position elevated from the frame to insure free gravitational descent of said material from the orifice of the selected hopper, and the other of said hoppers being releasable and elevationally positionable upon the return of said selected hopper to a lock position on the frame incident to a subsequent actuation of said powered means.

6. The mobile storage and dispensing device of claim 5 including an elongated telescopic material discharge chute; and articulated connector means selectively fastening said chute to the hoppers in communication with said orifices therein for rotation of the chute on dual axes to permit the discharge of material in substantially any direction from the hoppers.

7. A mobile storage and dispensing device for flowable bulk material comprising an elongated frame adapted to be mounted on a mobile vehicle having opposite ends and a plurality of substantially upstanding corner guides providing elongated channels therein; a pair of box-like hoppers for such material having opposite sides, an upper material receiving portion and a lower frusto-pyramidal lower portion providing a material discharge orifice from the hopper; an elongated telescopic spout having an upper end; means rotatably and swingably connecting said upper end of the spout to said lower portion of the hopper in communication with said discharge orifice; each of said hoppers including pairs of depending legs individually extended from said opposite sides of the hoppers and providing lower tapered ends disposed in spaced relation to the lower portion of the hopper adjacent to said discharge orifice therein for insertion into said channels of the corner guides; a pair of substantially horizontal braces individually extended between the lower ends of the legs and the lower portion of the hoppers; a pair of elongated lift arms having opposite ends individually pivotally connected to corresponding sides of the upper portions of the hoppers; a pair of elongated stabilizer rods having opposite ends individually pivotally connected to the hoppers in spaced relation to the respective pivotal connections of the ends of the lift arms to dispose the rods in spaced substantially parallel relation to the lift arms to form a parallelogram linkage between the hoppers; an elongated locking device extended longitudinally of the frame providing substantially upstanding levers pivotally mounted at the opposite ends of the frame adjacent to said corner guides, said levers including elongated pins selectively receivable through the channels in the corner guides above said braces on the hoppers selectively releasably to latch said hoppers to the frame; and a pair of elongated hydraulic cylinders pivotally mounted on the frame providing pivotal connection to the lift arms intermediate their ends between the hoppers to raise a selected one of said hoppers to a position elevated from the frame to insure free gravitational descent of said material from the orifice of the selected hopper, and the other of said hoppers being releasable and elevationally positionable upon the return of said selected hopper to a locked position on the frame incident to manipulation of said locking device and a subsequent actuation of said hydraulic jacks.

References Cited by the Examiner
UNITED STATES PATENTS

| | | |
|---|---|---|
| 402,174 | 4/1889 | Mackall. |
| 3,193,150 | 7/1965 | Simas. |

GERALD M. FORLENZA, *Primary Examiner.*

A. J. MAKAY, *Assistant Examiner.*